United States Patent
Stephens

(10) Patent No.: US 9,173,390 B2
(45) Date of Patent: Nov. 3, 2015

(54) TRAP CLIP

(71) Applicant: Carlis Glen Stephens, Warrenton, MO (US)

(72) Inventor: Carlis Glen Stephens, Warrenton, MO (US)

(*) Notice: Subject to any disclaimer, the term of this patent is extended or adjusted under 35 U.S.C. 154(b) by 0 days.

(21) Appl. No.: 13/815,524

(22) Filed: Mar. 9, 2013

(65) Prior Publication Data
US 2014/0252184 A1  Sep. 11, 2014

(51) Int. Cl.
*A01M 23/24* (2006.01)
*A01M 23/26* (2006.01)
*F16B 2/24* (2006.01)

(52) U.S. Cl.
CPC ............ *A01M 23/245* (2013.01); *A01M 23/26* (2013.01); *F16B 2/248* (2013.01)

(58) Field of Classification Search
CPC ........ F16B 2/248; A01M 23/26; A01M 23/00
USPC .............. 43/88, 89, 96, 97; 248/218.1, 218.4, 248/302, 303
See application file for complete search history.

(56) References Cited

U.S. PATENT DOCUMENTS

| | | | | |
|---|---|---|---|---|
| 751,406 A * | 2/1904 | Parshall | ............................ | 24/561 |
| 833,827 A * | 10/1906 | Dawkins | ............................ | 43/88 |
| 939,520 A * | 11/1909 | Leyner | ............................ | 383/68 |
| 1,030,165 A * | 6/1912 | Crites | ............................ | 43/96 |
| 1,107,218 A * | 8/1914 | Kirk | ............................ | 43/58 |
| 1,201,427 A * | 10/1916 | Angvick | ............................ | 43/96 |
| 1,222,510 A * | 4/1917 | Zirkle | ............................ | 24/551 |
| 1,311,628 A * | 7/1919 | Walsh | ............................ | 248/315 |
| 1,583,391 A * | 5/1926 | Cook | ............................ | 40/659 |
| 1,758,763 A * | 5/1930 | Reed | ............................ | 43/88 |
| 1,851,371 A * | 3/1932 | Northup | ............................ | 43/83.5 |
| 2,149,062 A * | 2/1939 | Maurer | ............................ | 43/89 |
| 2,414,907 A * | 1/1947 | Smith | ............................ | 43/89 |
| 2,914,288 A * | 11/1959 | Beller | ............................ | 248/500 |
| 2,985,932 A * | 5/1961 | Windish | ............................ | 248/63 |
| 3,010,245 A * | 11/1961 | Conibear | ............................ | 43/90 |
| 3,749,346 A * | 7/1973 | Cherniak | ............................ | 248/302 |
| 3,883,934 A * | 5/1975 | Rochfort | ............................ | 248/65 |
| 3,974,592 A * | 8/1976 | Staats | ............................ | 43/88 |
| 3,990,174 A | 11/1976 | Sallis | | |
| 3,996,691 A | 12/1976 | Reed | | |
| 4,000,578 A * | 1/1977 | Souza | ............................ | 43/92 |
| 4,005,542 A | 2/1977 | Anderson | | |
| 4,099,298 A * | 7/1978 | Gimenez | ............................ | 24/27 |
| 4,107,868 A * | 8/1978 | Conibear et al. | ............................ | 43/88 |
| 4,109,407 A | 8/1978 | Johnson | | |
| 4,146,990 A * | 4/1979 | Conibear | ............................ | 43/88 |
| 4,152,861 A * | 5/1979 | Miller | ............................ | 43/88 |
| 4,161,080 A | 7/1979 | Gabry | | |
| 4,236,341 A * | 12/1980 | Torkko | ............................ | 43/88 |
| 4,250,654 A * | 2/1981 | Souza et al. | ............................ | 43/90 |
| 4,300,305 A | 11/1981 | King | | |
| 4,308,682 A * | 1/1982 | Cesar | ............................ | 43/88 |

(Continued)

*Primary Examiner* — Nkeisha Smith
(74) *Attorney, Agent, or Firm* — Polster Lieder Woodruff and Lucchesi LC

(57) ABSTRACT

A trap clip (10, 20) for securely holding a trap (T) in a desired place until the trap is set off. The trap clip is of a one-piece carbon spring wire construction and in one embodiment (10) has a generally U shape. The trap clip includes a set of wound coils (1) formed along and centered on a base (3) of the trap clip. The trap clip further includes a pair of legs (2) one of which extends at generally right angles from respective end of the base, so to form the U shape of the trap clip. When installed, the legs both support and firmly grip the trap to hold in place on a pole (P) until the trap captures an animal.

5 Claims, 5 Drawing Sheets

(56) References Cited

U.S. PATENT DOCUMENTS

| | | | |
|---|---|---|---|
| 4,393,617 A | | 7/1983 | Charnoske |
| 4,411,091 A | | 10/1983 | Hedstrom et al. |
| 4,499,685 A | | 2/1985 | Sibley |
| 4,502,242 A | | 3/1985 | Scherrinsky |
| 4,549,367 A | * | 10/1985 | Jones, Sr. .......... 43/88 |
| 4,738,424 A | * | 4/1988 | Conner .......... 248/340 |
| 4,802,301 A | * | 2/1989 | Isborn et al. .......... 43/58 |
| 4,823,504 A | | 4/1989 | Ronning |
| 5,577,341 A | | 11/1996 | Mollo |
| 5,651,521 A | * | 7/1997 | Aberg .......... 248/218.4 |
| 5,736,203 A | * | 4/1998 | Swartz .......... 428/19 |
| 5,855,286 A | * | 1/1999 | Zaid .......... 211/87.01 |
| 5,930,943 A | * | 8/1999 | Olson .......... 43/96 |
| 6,438,893 B1 | | 8/2002 | DeCorby |
| 6,904,713 B2 | | 6/2005 | Beauregard |
| 7,421,822 B1 | * | 9/2008 | Ley .......... 43/96 |
| 7,886,498 B2 | * | 2/2011 | Baruh .......... 52/719 |
| 8,317,147 B1 | * | 11/2012 | Serrano .......... 248/302 |
| 2004/0216362 A1 | * | 11/2004 | Taylor .......... 43/44.83 |
| 2005/0210734 A1 | * | 9/2005 | Nowack et al. .......... 43/96 |
| 2009/0165421 A1 | * | 7/2009 | Baruh .......... 52/719 |
| 2012/0124933 A1 | * | 5/2012 | Baruh .......... 52/719 |

* cited by examiner

TRAP CLIP

CROSS REFERENCE TO RELATED APPLICATIONS

This specification is a substitute specification for U.S. patent application Ser. No. 13/815,524 filed Mar. 9, 2013 and published Sep. 11, 2014 as Pub. No. US 2014/0252184 A1.

STATEMENT REGARDING FEDERALLY SPONSORED RESEARCH OR DEVELOPMENT

N/A

THE NAMES OF PARTIES TO A JOINT RESEARCH AGREEMENT

N/A

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

N/A

STATEMENT REGARDING PRIOR DISCLOSURES BY THE INVENTOR OR A JOINT INVENTOR

N/A

BACKGROUND OF THE INVENTION

This invention is directed to body grip style traps and foothold style traps for trapping animals such as muskrats; and, more particularly to a trap clip for use with such traps to hold a trap in an upright position when the trap is set.

A body grip type trap for catching animals such as muskrats, beavers, and similar animals is shown, for example, in U.S. Pat. No. 6,904,713 B2. As disclosed in this patent, body grip traps include a set of jaws which are biased to an open position. When the trap is sprung, a trigger releases the jaws which close on the animal and entrap it.

A problem with such traps is that they are bulky, and because of this a support used to hold it in place cannot be adjusted. Rather, the trap must be tethered to some object so it is supported in an upright position on the ground. This is done to prevent loss of the trap.

A wire form has been used as a clip for a body grip trap for purposes of supporting the trap. However, these forms are usually not durable and also can easily be deformed so as to not be usable for their intended purpose. Also, even with these forms, the trap must still be tethered to another object. Further, such wire forms are solely for use on the ground, not in water, and also lack adjustability.

Other trap supports which are made of steel are heavy and bulky, and also lack adjustability.

Another type trap is a foothold style trap. These are stamped devices which require screws to hold them in place. Clips for these type traps also lack adjustability and further prevent the trap from being freed from its restraint after an animal is caught in it.

Yet another type trap that was used for quite some time was constructed using a series of nuts welded together. This trap had two (2) legs that went through coils of the trap and a trap holder was bolted onto a pole. The trap was difficult to construct because numerous pieces had to be welded together. Another problem with this trap was that it would frequently be dislodged (fall off) the holder. Still another problem was that the bolt would rust tight.

BRIEF SUMMARY OF THE INVENTION

The present disclosure is directed to an animal trap clip for use with body grip type traps used to trap muskrats and the like.

The trap clip is of a unitary, single piece construction and is very light weight, durable, and easy to use.

The clip is made of a carbon spring wire and is generally U shaped. A base portion of the clip spanning between the legs of the clip has a central coil or coils formed in it. The diameter of the coil is such that the clip can be inserted over a pole while the legs of the clip are squeezed together to attach the clip to a trap used to catch the animal.

Two embodiments of the trap clip are disclosed.

Other objects and features will be in part apparent and in part pointed out hereinafter.

BRIEF DESCRIPTION OF THE SEVERAL VIEWS OF THE DRAWINGS

The accompanying figures, which together with detailed description that follows, form part of the specification and illustrate the various embodiments described in the specification.

Corresponding reference characters indicate corresponding parts throughout the several views of the drawings.

DETAILED DESCRIPTION OF THE INVENTION

Figure 1:
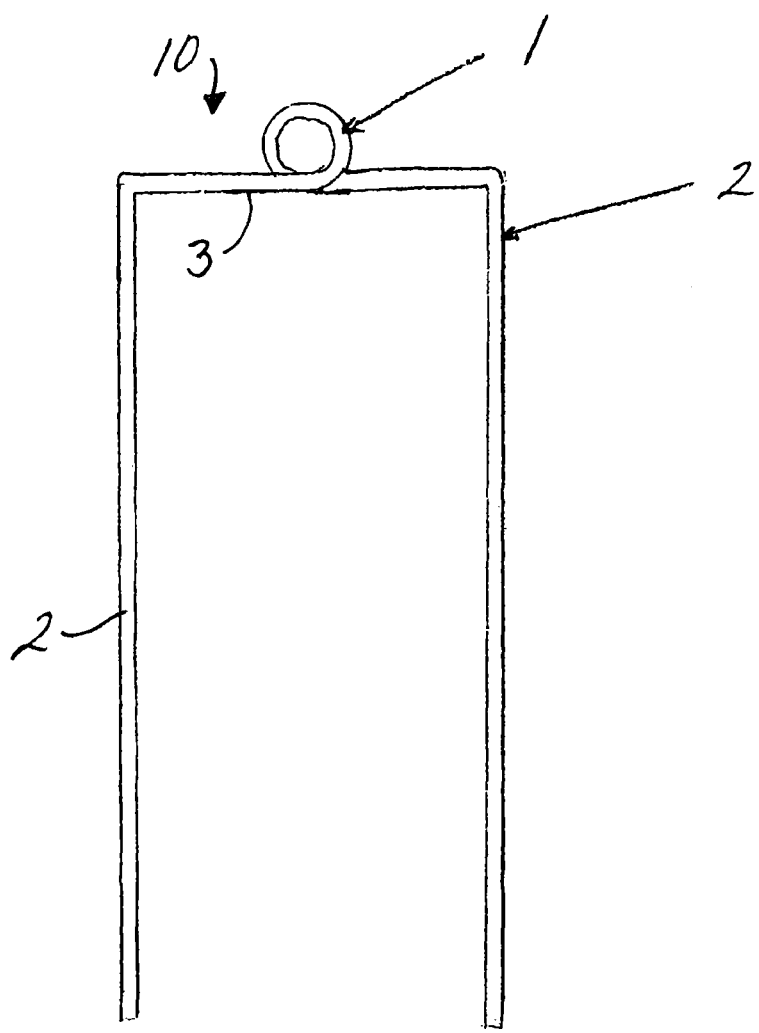
FIG. 1 is a plan view of a first embodiment of the trap clip of the present invention.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Figure 2:
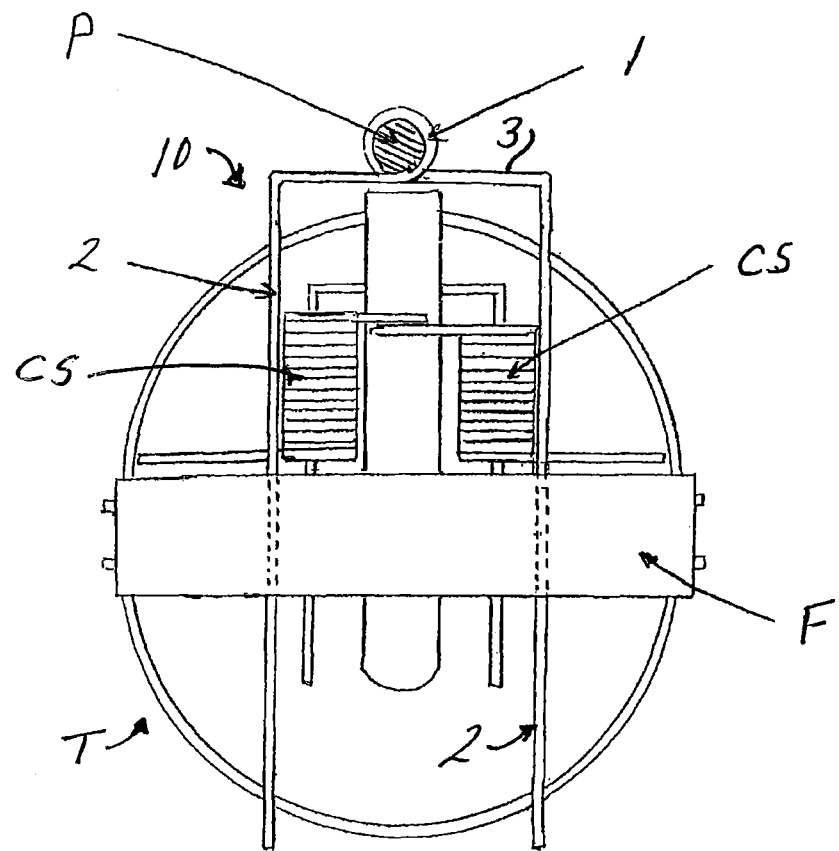
FIG. 2 is a plan view of the trap clip with its legs installed on an animal trap and with a coil portion of the clip fitted over a pole.
Figure 5:
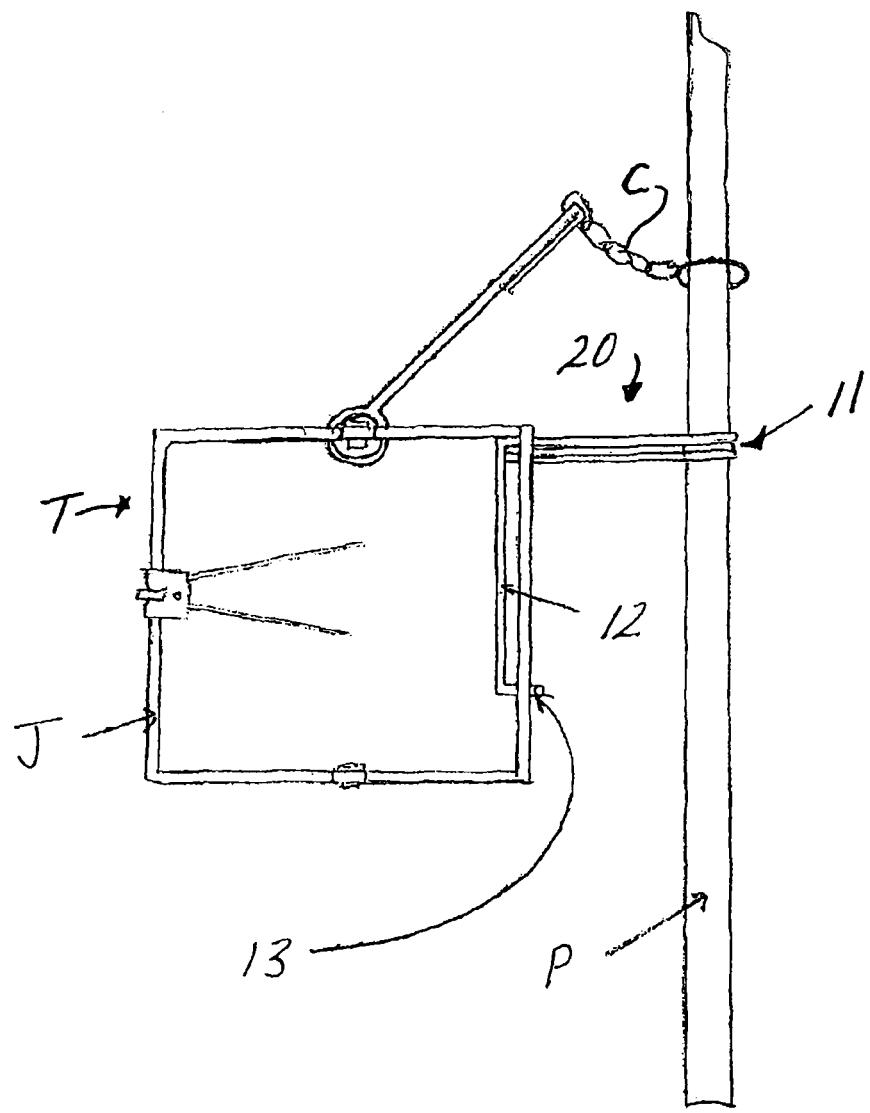

Referring to FIGS. 1 and 2, a trap support or trap clip 10 of the present invention comprises a light weight, durable, and easy to use support for a body grip type animal trap T such as shown in FIG. 2. The trap clip is of a one-piece carbon spring wire construction. Trap clip 10 is of a generally U shape and has a set of wound coils 1 formed along and centered on a base 3 of the trap clip. In FIG. 5, for example, a trap clip is shown having two coil windings 1. The trap clip further includes a leg 2 extending at generally right angles from each end of base 3, so to form the U shape of trap clip 10. As shown in the drawings, the legs 2 extend generally parallel to each other. As described hereinafter, the legs both support and firmly grip trap T.

Figure 3:
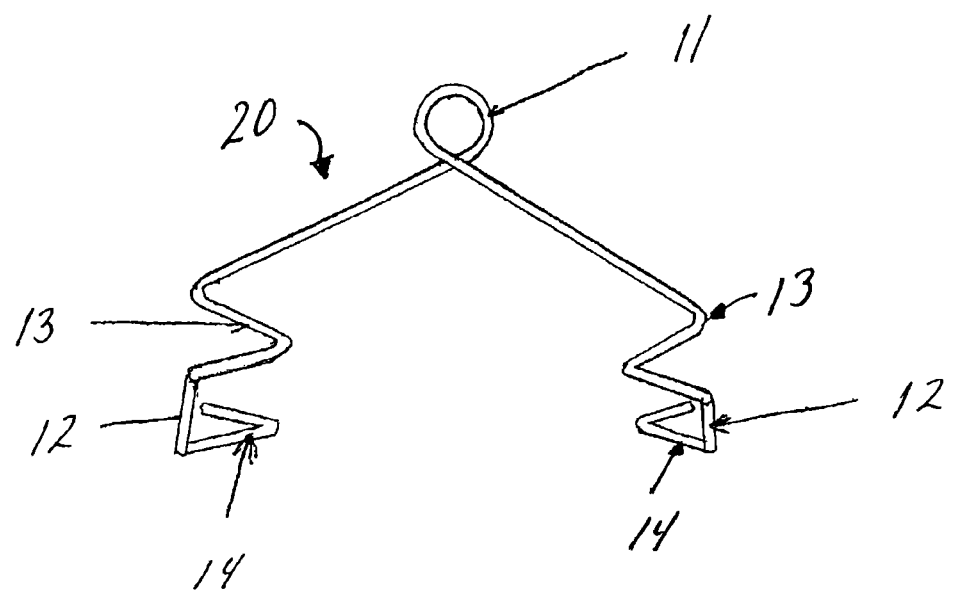
FIG. 3 is a plan view of a second embodiment of the trap clip.
Figure 4:
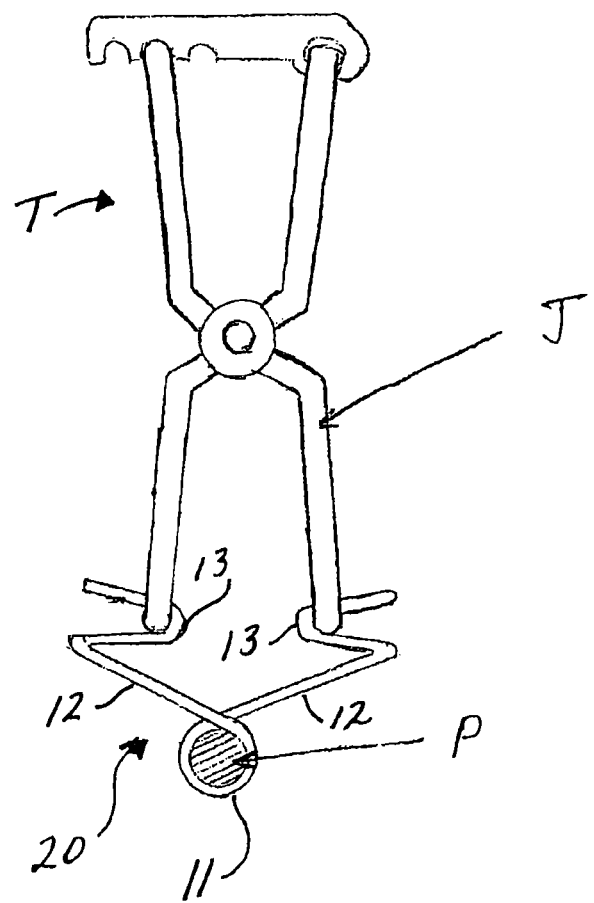
FIG. 4 is a plan view of the second embodiment of the trap clip with loops formed on the legs of the trap clip capturing the jaw of a body grip trap; and, FIG. 5 is an elevation view of the assemblage of FIG. 4.

Referring to FIG. 3, in a second embodiment 20 of the trap clip, legs 12 of the trap clip extend away from coils 11 formed on the base of the clip at an angle less than a right angle. As shown in the drawing, the legs 12 each have an indentation or loop 13 formed intermediate their length, and another indentation or loop 14 formed at their distal end. The loops 13, 14 facilitate trap clip 20 holding a body grip style trap in an upright position. It will be understood by those skilled in the art that trap clip 20 may have only one indentation or loop, loop 13, formed on each leg rather than two, this being as shown in FIGS. 4 and 5.

To help understand the advantages of trap clip 10 or 20, first, it is determined the size (diameter) of the rod or pole P on which the trap clip will be installed. See FIGS. 2 and 5. Once this is done, a predetermined hardened steel dowel is selected on which to wind the coils 1 or 11 of the respective clip 10 or 20. It will be understood that in doing this, allowances are made for heat treating the trap clip so that its coils will be not too tight or too loose. After the coils 1 for a trap clip 10 are wound, the legs 2 are bent at right angles to base 3 at each end of the base to form the U-shape of the trap clip.

To install trap clip 10, the user squeezes the legs 2 together at base 3 of the U formed by the trap clip. This unwinds (enlarges the diameter of) the coils 1 so trap clip 10 can be slid onto and down the length of pole P until the trap clip is in a desired position on the pole. When the user then releases the legs, the diameter of the coils 1 return to their original size and trap clip 10 is locked down onto the pole. As further shown in FIG. 2, the width of base 3 of trap clip 10 is such that when installed on trap T, the distance between the legs 2 is such as to extend along the trap to the outside of coils springs CS of the trap and engage a frame F of the trap.

Installation of trap clip 20 onto a pole P is accomplished in a similar way.

Referring to FIGS. 4 and 5, to install a set foot trap such as a coil spring style trap, the trap is first set. Then a first leg 12 of trap clip 20 is placed just outside of the coil spring of the trap between a lower frame portion and an upper spring lever. Next, the user pushes outwardly on a first leg 12 of the trap clip, the trap being spread into a U-shape. Then, the user places the other leg 12 outside the opposite coil of the trap between the frame and spring lever of the trap. Once that is done, the user completely slides the trap onto both legs 12. A chain C of the trap is then attached to pole P if that has not already been done.

The entire assemblage is now placed into the water at a desired location. Bait or a lure (neither of which is shown) is placed on pole P above the trap. When an animal is caught, trap T is released from trap clip 20 and slides down the pole.

Other traps can be installed in a similar manner and in some instances the legs 12 of trap clip 20 apply an outward pressure on the jaws J of the trap. In these installations, the jaws J of a body grip trap T are placed in the loop 13 of the first leg 12 of a trap clip 20, and then the other leg 12 is squeezed together with the first leg and a second jaw J of the trap is set into the loop 13 of this other leg. The outward pressure now exerted by the legs 12 hold the trap in place until the trap is set off.

In view of the above, it will be seen that the several objects and advantages of the present disclosure have been achieved and other advantageous results have been obtained.

SEQUENCE LISTING

N/A

Having thus described the invention, what is claimed and desired to be secured by Letters Patent is:

1. A trap clip in combination with an animal trap including a foothold animal trap or a body grip animal trap, the trap clip positioning and supporting the animal trap in a desired location on a support until the animal trap is sprung by an animal, the trap clip comprising:
   an elongate base and a pair of legs, each leg extending from the base at a respective end of the base and with the base and legs forming a generally U-shape, the legs engaging a portion of the animal trap and supporting the animal trap in the desired location when the trap clip is set in place; and,
   a plurality of wound coils formed on the base intermediate the ends of the base, the coils expanding when the legs are squeezed together whereby a diameter of the coils are then greater than a diameter of the support on which the trap clip is installed thereby installing the coils over and about the support, the coils engaging the support when the legs are subsequently relaxed thereby positioning and holding the trap clip with the animal trap at the desired location on the support.

2. The combination trap clip and animal trap of claim 1 in which the support is a pole.

3. The combination trap clip and animal trap of claim 1 in which the legs of the trap clip extend generally parallel to each other from the base of the trap clip with the width of the base being such for the legs extending from the base to grip the animal trap to support the trap.

4. The combination trap clip and animal trap of claim 1 in which the trap clip is of a one-piece metal construction.

5. The combination trap clip and animal trap of claim 4 in which the metal construction is a heat treated carbon spring wire.

* * * * *